United States Patent
Compera et al.

(10) Patent No.: US 6,267,225 B1
(45) Date of Patent: Jul. 31, 2001

(54) SHEET-CONVEYING DEVICE FOR MACHINES USED IN THE PRINTING TECHNOLOGY FIELD

(75) Inventors: Christian Compera, Schönau; Patrick Metzler, St. Wendel; Anton Rodi, Leimen; Carsten Schönfeld, Reilingen; Peter Schulz, Matzenbach; Paul Weiss, Queidersbach, all of (DE)

(73) Assignee: Heidelberger Druckmascheinen Aktiengesellschaft, Heidelberg (DE)

( * ) Notice: Subject to any disclaimer, the term of this patent is extended or adjusted under 35 U.S.C. 154(b) by 438 days.

(21) Appl. No.: 09/067,811

(22) Filed: Apr. 28, 1998

Related U.S. Application Data (63) Continuation of application No. PCT/EP96/04677, filed on Oct. 28, 1996.

(30) Foreign Application Priority Data

Oct. 28, 1995 (DE) .............................. 195 40 210
Oct. 21, 1996 (DE) .............................. 196 43 106

(51) Int. Cl.$^7$ .................................................. B65G 17/26
(52) U.S. Cl. ........................ 198/691; 271/18.1; 271/193
(58) Field of Search ........................ 198/691; 271/18.1, 271/18.2, 193

(56) References Cited

U.S. PATENT DOCUMENTS 5,121,170 * 6/1992 Bannai et al. ...................... 271/193
5,255,904   10/1993 Taguchi et al. .
5,382,014    1/1995 Fukube .

FOREIGN PATENT DOCUMENTS 2 232 147    12/1990 (GB) .
361124455  * 6/1986 (JP) ..................................... 198/691
406171755  * 6/1994 (JP) ..................................... 198/691

OTHER PUBLICATIONS

International Publication No. 97/16366 (Compera et al.), dated May 9, 1997.

* cited by examiner

*Primary Examiner*—Joseph E. Valenza
(74) *Attorney, Agent, or Firm*—Herbert L. Lerner; Laurence A. Greenberg; Werner H. Stemer (57) ABSTRACT

A device for conveying thin workpieces for machines used in the printing technology field having at least one movable conveying element having an electrically insulating contact surface supporting at least one workpiece as it is being conveyed, the contact surface of the conveying element being formed with regions of varying charge density by electric charges applied thereto, and the workpiece being held on the contact surface by electrostatic forces, includes a multiplicity of contacts engaging the surface of the conveying element, the multiplicity of contacts including at least one given group thereof, the multiplicity of contacts being disposed transversely to a direction in which the thin workpiece is conveyable by the conveying element and being distributed across the entire width of the workpiece, the multiplicity of contacts being connected to at least one d.c. voltage source.

7 Claims, 12 Drawing Sheets

SHEET-CONVEYING DEVICE FOR MACHINES USED IN THE PRINTING TECHNOLOGY FIELD

CROSS-REFERENCE TO RELATED APPLICATIONS

This is a continuation of International Application Serial No. PCT/EP96/04677, filed Oct. 28, 1996, which designated the United States.

BACKGROUND OF THE INVENTION

Field of the Invention

The invention relates to a sheet-conveying device for machines used in the printing technology field.

It has become known heretofore to hold thin workpieces such as sheets firmly and transport them with the aid of electrostatic devices. U.S. Pat. No. 4,244,465 discloses a device of that general type, whereby sheets are transported on a conveyor belt, wherein two groups of strip-shaped, equally spaced electrodes are integrated. The electrodes are surrounded by an insulating material and are connected to a high-voltage source, so that an electrostatic field is produced across the surface of the conveyor belt. A disadvantage of such a construction is that the electrodes revolve with the conveyor belt, which results in an increase in wear and tear of the electrodes and the conveyor belt. Furthermore, the structure of the electrodes rises above the surface of the conveyor belt, so that the contact surface is not completely even, which can be disadvantageous when transporting and processing thin sheets. The holding forces acting upon the sheets are reduced due to surface discharges; it may thereby become necessary to change the high-voltage polarity. The inhomogenous field created by the electrodes cannot be compensated for completely by the sheets, so that an increased deposit of dust is produced upon the conveyor belt. Due to a parasitic corona which can be formed when the sheets are removed from the conveyor belt, surface charges accumulate in the insulating layer covering the electrodes. The surface of the conveyor belt may thereby become passivated, and the holding forces acting upon the sheet may accordingly be lost.

U.S. Pat. No. 4,526,357 describes a sheet separating or singling device which is based upon the same principle as that mentioned hereinabove.

The published European Patent Document EP 0 297 227 A2 shows an electrostatic holding device having electrodes pairwise embedded in a basic material and being connected to voltage sources which alternatingly change their polarity.

The published German Patent Document DE 4012 210 A1 discloses a sheet-conveying device with an endless belt wherein no electrodes are provided in the material of the belt. With the aid of an electrode which extends across the width of the belt and is in contact with an a.c.-voltage source, a charge-density pattern is formed on the surface of the belt by touching. The resulting non-uniform electrical field creates reflecting charges in the material of the sheets; thereby a holding power is generated to keep the sheets on the surface of the belt.

In order to attain uniform holding forces, the frequency of the a.c. voltage should be in phase with the revolving speed of the belt, which calls for expenditures involving control technology. Because the in-phase state cannot be realized completely, positively charged fields, for example, are charged negatively during the succeeding revolution of the belt. A corona effect produced by this change in charge causes ozone and nitrogen oxide to escape into the environment. The consumption of energy is increased. Particularly when the spacing between the positively and the negatively charged fields on the surface of the belt is rather slight, more changes in charge occur both when the belt runs into the effective range as well as when it runs out of the effective range of the charge electrode.

The use of a.c. voltage increases the tendency towards sliding discharges along the insulating surface of the belt. Due to the finite ohmic resistance on the surface of the belt, distances or spacings between the charges of more than 1 mm are optimal. It is thereby possible to deposit the sheets on the belt in such a manner that the edges of the sheets are at a given distance from a charge extremum. The maximal holding force cannot thereby act upon the sheet edges, which would be desirable for many uses.

In the construction according to the published German Patent Document DE 4012 210 A1, a blade-shaped electrode or a charge roller is provided having a large spatial range. When using high a.c. voltages, capacitive interferences with electronic control circuits may occur, which can only be reduced by providing additional shields, filters, and the like.

If the charging roller is to be used simultaneously as a tensioning roller for a belt having an inner conductivity, then a high capacity exists between the charging roller and the belt due to the looping angle. When a.c. voltage is applied, a high blind power and a high energy demand, respectively, result.

In U.S. Pat. No. 3,726,520, there is described a separating or singling device for sheets at the top of a sheet pile, whereby a cyclical reciprocally displaced foil or an endless belt being charged to a defined potential by a corona-charge source is used as a conveyor element. As the transported sheet approaches, it is attracted to the charged conveyor element and held there until a discharge of the conveyor element takes place. The sheets are also charged by static induction, however, the danger then exists that the sheets retain residual charges after they leave the conveyor element, which may be a hindrance in the further transport or further processing of the sheets. Particularly in electrostatic printing devices, residual charges on the printing material are a cause of printing errors or misprints.

SUMMARY OF THE INVENTION

It is accordingly an object of the invention of the instant application to provide a thin workpiece or sheet-conveying device for machines used in the printing technology field wherein a conveyor element of the device carrying the thin workpieces is of relatively simple construction and has a surface structure which does not hinder the transport and the process taking place in a respective machine used in the printing technology field and also has a long working life. Furthermore, the remaining residual or net charges on the thin workpieces and the negative environmental influences are minimized.

With the foregoing and other objects in view, there is provided, in accordance with the invention, a device for conveying thin workpieces for machines used in the printing technology field, including at least one movable conveying element having an electrically insulating contact surface supporting at least one workpiece as it is being conveyed, the contact surface of the conveying element being formed with regions of varying charge density by electric charges applied thereto, and the workpiece being held on the contact surface by electrostatic forces, comprising a multiplicity of contacts engaging the surface of the conveying element, the multiplicity of contacts including at least one given group thereof, the multiplicity of contacts being disposed transversely to a direction in which the thin workpiece is conveyable by the conveying element and being distributed across the entire width of the workpiece, the multiplicity of contacts being connected to at least one d.c. voltage source.

In accordance with another feature of the invention, the multiplicity of contacts engaging the surface of the conveying element include a plurality of different groups thereof, the contacts of the different groups being alternately connected to d.c. voltage sources of varying potential.

In accordance with a further feature of the invention, the group of contacts is formed of coaxially arranged rings of like, diameter rollable off on the surface of the conveying element and connected to one another so as to be electrically conductive.

In accordance with an added feature of the invention, the contacts of all of the groups of contacts are arranged coaxially with respect to one another.

In accordance with an additional feature of the invention, the contacts are arranged on a cylinder formed of insulating material.

In accordance with yet another feature of the invention, the contacts are spaced a distance apart from one another, in a direction transverse to the conveying direction, the spaced distance being adjustable in accordance with the dimensions of the thin workpiece to be conveyed.

In accordance with a concomitant feature of the invention, the one group of contacts engaging the surface of the conveying element is connected to a d.c. voltage source; and an electrostatic charge device is disposed upstream of the group of contacts, as viewed in the conveying direction, for generating on the surface of the conveying element a homogeneous charge having a potential which is the opposite of the potential of the d.c. voltage source.

Belts or cylindrical bodies can be used as conveying elements. It is essential that the conveying element contains a homogeneous layer of dielectric material. Electric charges with a constantly varying polarity are applied to the sheet-contact surface of the conveying element. It is thereby possible to transport on the conveying element all types of sheet materials upon which forces act in an inhomogenous electrical field. An especially suitable sheet material is ordinary paper.

In the case of machines in the printing technology field having a plurality of sheet-processing stations, several conveying elements may be arranged behind or in parallel with one another. Depending upon the requirements, conveying elements which are designed as belts may have straight-lined conveying paths or paths with random curves aided by suitable guiding elements. If the process in or at a respective machine requires, the sheet-contact surface of the conveying element need not be planar and, due to the electrostatic forces, the sheets can virtually assume the shape of the contact surface.

No electrodes are integrated in the conveying elements, as they could wear out prematurely in the case of a belt-type conveying element. Due to the fact that, with the electrodes being situated in the carrier body, charges of opposite polarities are impressed into the insulating layer of the conveying element, almost no residual charges or net charges which could disturb the further transport can build up on the sheets. The amount of charge is almost completely equalized, so that, towards the outside, the insulating layer of the conveying element is electrostatically neutral. The charges are maintained at least during transport. The conductivity on the surface of the insulating layer may be so dimensioned that the holding forces decrease during transport and have almost entirely vanished at the end of the conveying path.

It is possible to neutralize the charges remaining before new charges are applied, so that a defined section of the conveying element is not polarized. Suitable materials for the insulating layer, whereon the applied charges are partially maintained, are suitable synthetic materials like polyester, polycarbonates, polyimides or PTFE.

In order to keep the holding forces of the sheets on the conveying element constant, it is possible to operate the device producing the charges with variable voltages or to arrange or change the spacing of the electrodes applying the charges onto the conveyor belt in a manner that the desired distribution and amount of holding forces are present across the contact surface. When a printed or coated sheet is to be transported, the charge distribution and the local amount of charge can then be produced in correspondence with the printed image or the coating.

Because electric charges are very much dependent upon atmospheric conditions and upon changes in material properties of the conveying elements and of the sheets, it is possible to change the charge distribution and the local amount of charge to be applied in accordance with these conditions or properties. For this purpose, respective sensors can be used which detect, for example, the humidity, the barometric pressure, the air temperature and the moisture of the sheet material. The sensor signals can be transmitted to a control unit which, after having processed the signals, actuates respective adjustment elements of the devices producing the charge. Thus, control or regulation of the charge distribution and the local amount of charge is feasible.

Other features which are considered as characteristic for the invention are set forth in the appended claims.

Although the invention is illustrated and described herein as embodied in a sheet-conveying device for machines used in the printing technology field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 14.1 is a longitudinal sectional view partly broken away, of an embodiment of a charge roller forming part of the device according to the invention;

FIG. 14.2 is a cross-sectional view of FIG. 14.1 taken along the line XIV.II—XIV.II in the direction of the arrows; and FIGS. 15.1 and 15.2 are respective portions of a flow chart illustrating the mode of operation of the device according to FIG. 1.

DESCRIPTION OF THE PREFERRED EMBODIMENTS

Figure 1:
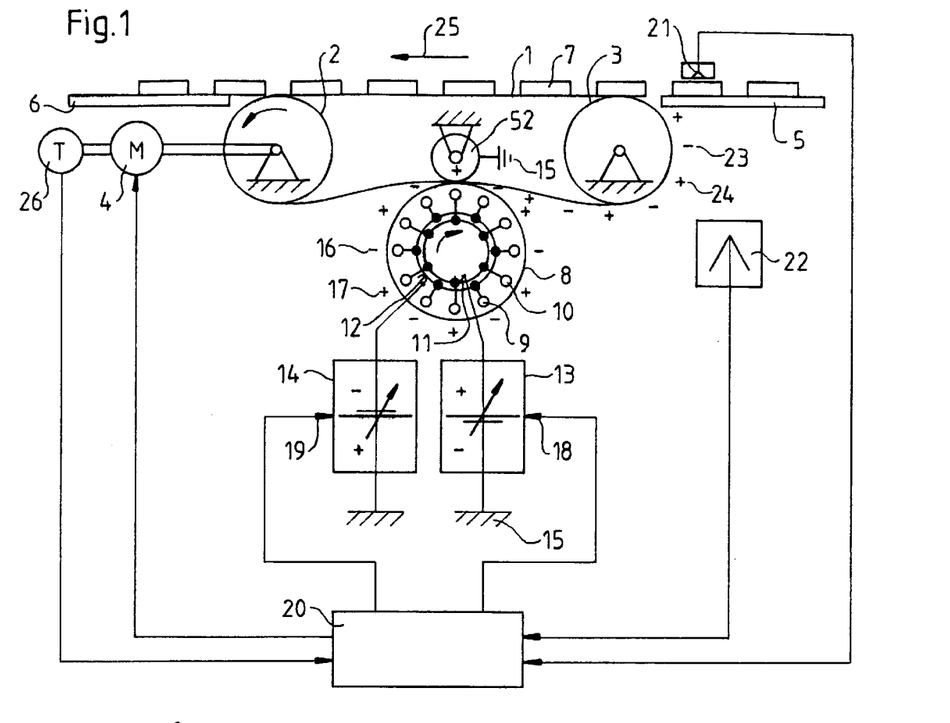
FIG. 1 is a fragmentary diagrammatic and schematic view of a sheet-conveying device for machines used in the printing technology field including a belt-type conveyor or transport element.

Referring now to the drawings and, first, particularly to FIG. 1 thereof, there is shown therein a conveyor belt 1 wound around two guide rollers 2 and 3. The conveyor belt 1 is formed of a dielectric material. The guide roller 2 is coupled with a drive motor 4. The thus-illustrated arrangement further includes a feed table 5 and a delivery table 6 for thin workpieces or sheets 7 to be transported. A lower and slack side or strand of the conveyor belt 1 is engaged by a charge roller 8 which is rotated by friction as the belt 1 revolves. Opposite the charge roller 8 is a grounding roller 52 connected to ground potential at 15 and rolling off on the inside of the conveyor belt 1. In the surface of the charge roller 8, two groups of electrodes 9 and 10 are arranged and are connected to respective adjustable high-voltage sources 13 and 14 via respective slip rings 11 and 12.

The electrodes 9 are connected to a negative potential 16 which is opposite to the ground potential 15, while the electrodes 10 are connected to positive ground potential 17. The high-voltage sources 13 and 14 have respective control inputs 18 and 19 which are connected to a suitable control unit 20. The control unit 20 is furthermore connected to moisture sensors 21 and 22 for detecting surface moisture of the sheets 7 and humidity in the environment of the charge roller 8. The control unit 20, besides being connected to the moisture sensors 21 and 22, can also be connected to further, non-illustrated sensors, for example, to sensors for detecting atmospheric pressure and air temperature.

Figure 2:
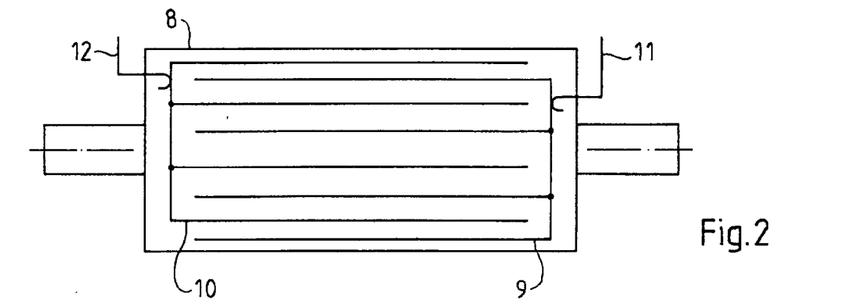
FIG. 2 is a diagrammatic side elevational view of an embodiment of a charge roller forming part of the sheet-conveying device of FIG. 1.

FIG. 2 illustrates diagrammatically how the electrodes 9 and 10 extend, in a substantially uniform distribution, across the entire width of the charge roller 8.

Figure 3:
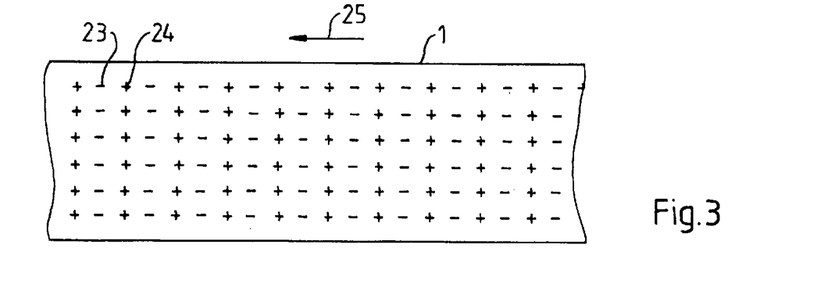
FIG. 3 is a fragmentary diagrammatic plan view of the belt conveyor of FIG. 1 having a charge distribution depicted thereon.

The conveyor belt 1 is charged with alternating polarity for conveying the thin workpieces or sheets 7. An exemplary distribution of the charges 23 and 24 on the contact surface of the conveyor belt 1 is illustrated in FIG. 3. In accordance with the arrangement of the electrodes 9 and 10 illustrated in FIG. 2, the negative charges 23 and the positive charges 24 alternate in series in a direction represented by the horizontal arrow 25. The charging of the conveyor belt 1 is effected by the charge roller 8. The high-voltage sources 13 and 14 are set to a substantially equal though opposite voltage via the control voltages at the control inputs 18 and 19. At the electrodes 9 and 10 opposite the grounding roller 52, a static electric field is formed which, due to the contact with the conveyor belt 1 and due to the corona effect, creates virtual electrodes on the conveyor belt 1. When a sheet 7 is deposited, a force is exerted upon the sheet 7 in a vertical direction with respect to the surface of the conveyor belt 1, as shown in FIG. 1. At the end of the path over which the sheet 7 is conveyed by the conveyor belt 1, the sheet 7 is further transported from the conveyor belt 1 to the delivery table 6 by a non-illustrated removal device. The surface resistance of the convey belt 1 can be dimensioned so that the charges 23 and 24, due to a creeping or surface leakage current, are equalized, until the transfer position is reached. The yet remaining holding forces can easily be overcome by the removal device. The local charge quantity can be varied in accordance with the signals of the moisture sensors 21 and 22. The speed of the motor 4 and the amount of charge to be applied can likewise be coordinated by the control unit 20 when the signals are processed by an incremental rotary encoder 26 coupled with the shaft of the motor 4.

Figure 4:
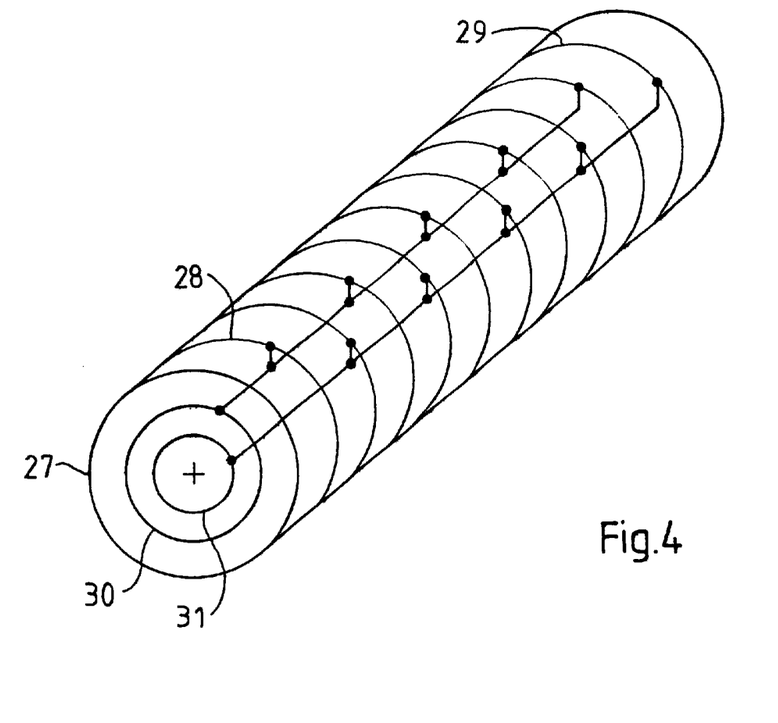
FIG. 4 is a diagrammatic perspective view of another embodiment of the charge roller having ring-like electrodes in accordance with the invention.
Figure 5:
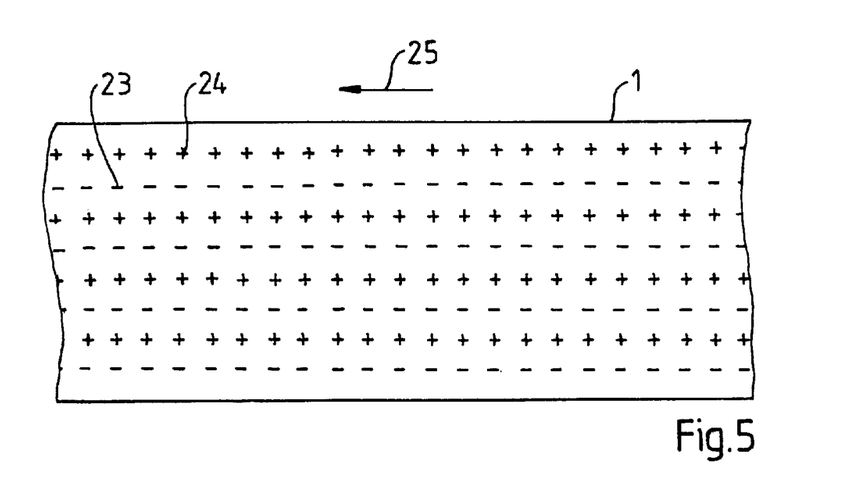
FIG. 5 is a fragmentary diagrammatic plan view of a charge distribution when ring-like electrodes are used.

In FIG. 4, a further embodiment of the charge roller 27 is illustrated. The electrodes 28 and 29 are embedded circumferentially in the surface of the charge roller 27 in a ring-like manner. Every second electrode 28, 29 is connected to one another and positioned on respective slip rings 30, 31. When a d.c. voltage essentially symmetrical to ground is applied to the slip rings 30 and 31, a charge distribution as shown in FIG. 5 is formed on the surface of the conveyor belt 1. Besides the herein aforedescribed dependence of the amount of d.c. voltage upon the transport speed, the humidity in the air and the moisture of the sheets 7, the d.c. voltage can also be varied in accordance with the size and the spacing of the sheets 7 and in accordance with the printed image on the sheets 7. For this purpose, an edge detector and an image exposure or pick-up device may be provided along the conveying path, and the signals therefrom may be processed in a control device.

Figure 6:
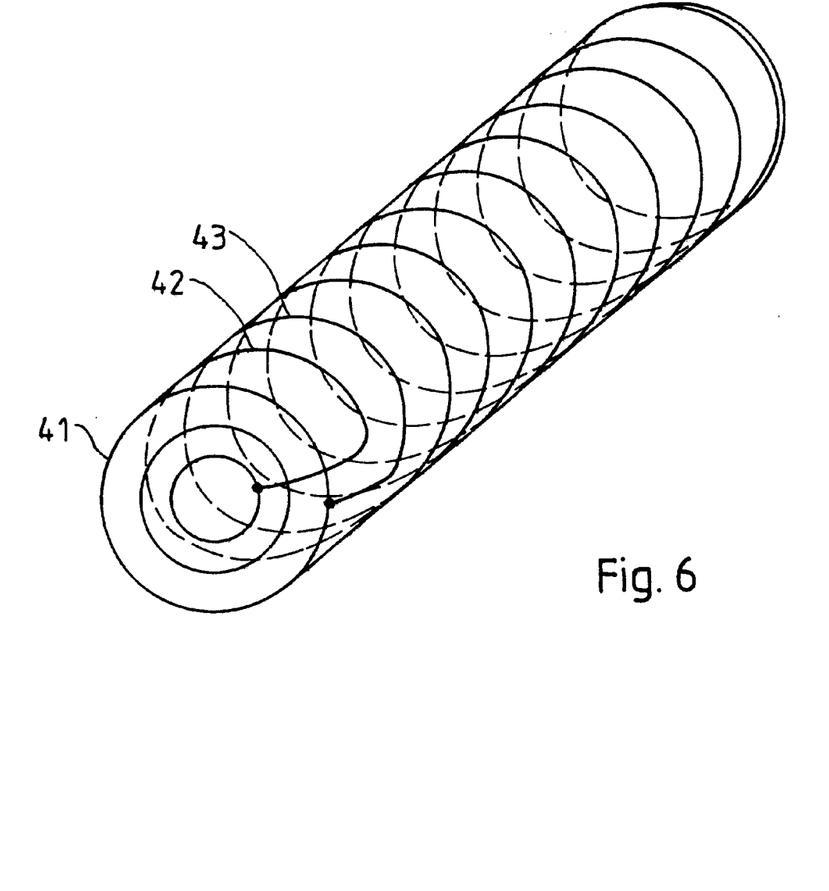
FIG. 6 is a diagrammatic perspective view of a further embodiment of the charge roller having spiral-like electrodes.
Figure 7:
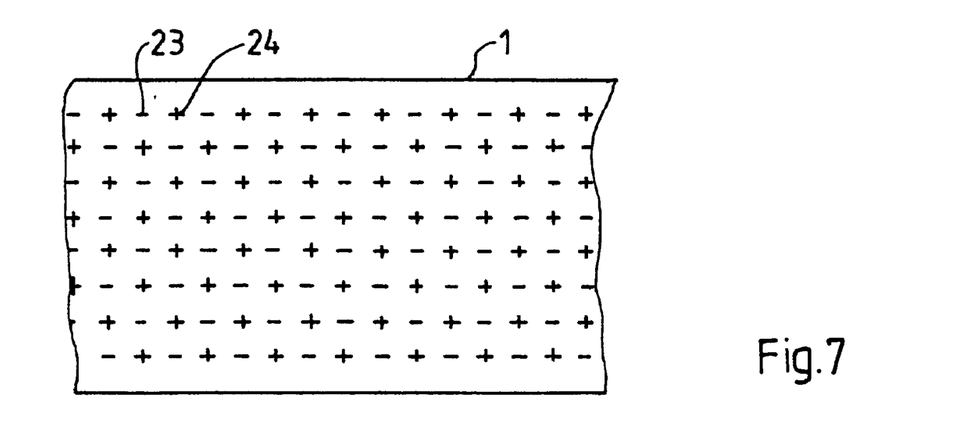
FIG. 7 is a fragmentary diagrammatic plan view of a charge distribution when spiral-like electrodes are used.

FIG. 6 shows an embodiment of a charge roller 41 having two electrodes 42 and 43 which are disposed in spiral form on the surface. The uniformity of the distribution of the charges 23 and 24 in the dielectric layer 39 of the conveyor belt 1 may thereby be improved. Such a charge distribution is shown in FIG. 7.

If a stronger holding force in the dielectric layer of the conveyor belt 1 is desired, two of the hereinaforedescribed charge rollers 8, 27 and 41, which rotate synchronously and are arranged directly behind one another, may be provided. It is thereby possible to vary the areas of the charge-islands.

The invention is not limited to the arrangement shown herein. Several conveyor belts 1 in compound arrangement, as well as conveyor belts 1 which cooperate with one or more transport drums maybe installed. It is also possible to provide several charging devices in touching and/or non-touching arrangement at a conveying element 1 for enabling a regeneration of the charges 23 and 24 over a very long conveying path.

When a single-layer conveyor belt 1 of dielectric material is used, the charging devices can also act upon the side facing away from the charging surface for the sheets 7, the material of the sheets 7 being able to be used as a counter electrode, or a grounded press-on roller may be used as a counter electrode. In the latter case, the effects of the forces can also be realized on non-conductive substrates. Furthermore, advantages are attained in the feeding and the removing of the sheets 7 and, with regard to the dust, which has an influence upon the charge relationships.

Figure 8:
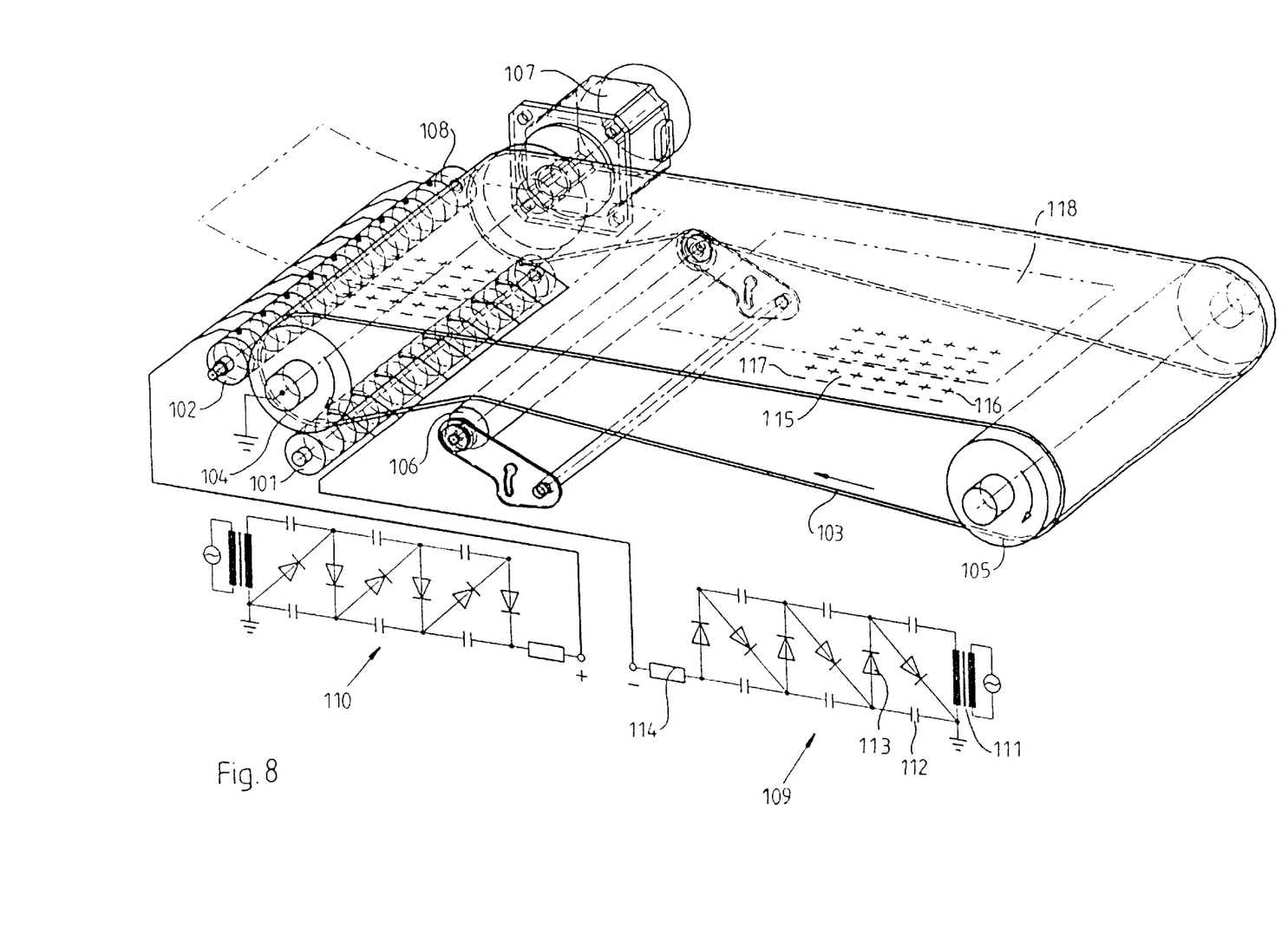
FIG. 8 is a schematic and diagrammatic perspective view of a first embodiment of the sheet-conveying device according to the invention which has two charge rollers and a single-layer conveyor belt.

FIG. 8 illustrates an embodiment of a conveying device with two charge rollers 101 and 102. The conveyor belt 103 is supported by two guide rollers 104 and 105 and one tension roller 106. The guide roller 104 is coupled with a drive motor 107. The charge rollers 101 and 102, respectively, are formed of equidistant and coaxially arranged rings 108. The rings 108 of the charge rollers 101 and 102 are at the same potential. The rings of the charge roller 101 are connected to a negative d.c. voltage source 109, and the rings 108 of the charge roller 102 are connected to a positive d.c. voltage source 110. Each d.c. voltage source 109,110 includes a high-voltage transformer 111, a cascade of capacitors 112 and diodes 113 and a barrier or series resistance 114. The charge rollers 101 and 102 or the rings 108 contact the surface of the conveyor belt 103 in the looping region around the guide roller 104. The guide roller 104 is connected to ground potential. When the conveyor belt 103 is moving, the rings 108 of the charge rollers 101 and 102 roll off on the surface of the conveyor belt 103. Through a displacement of the rings 108 of the charge rollers 101 and 102 in axial direction around a half of the distance between the rings 108, a charge pattern 115 (only partially illustrated in FIG. 8) is created on the surface of the conveyor belt 103. The charge pattern 115 contains traces of positive and negative charges 116 and 117. The traces are disposed in the conveying direction and have the same spacing from one another as the rings 108. A sheet 118 disposed on the surface of the conveyor belt 103 is held by the charges 116 and 117.

Figure 9:
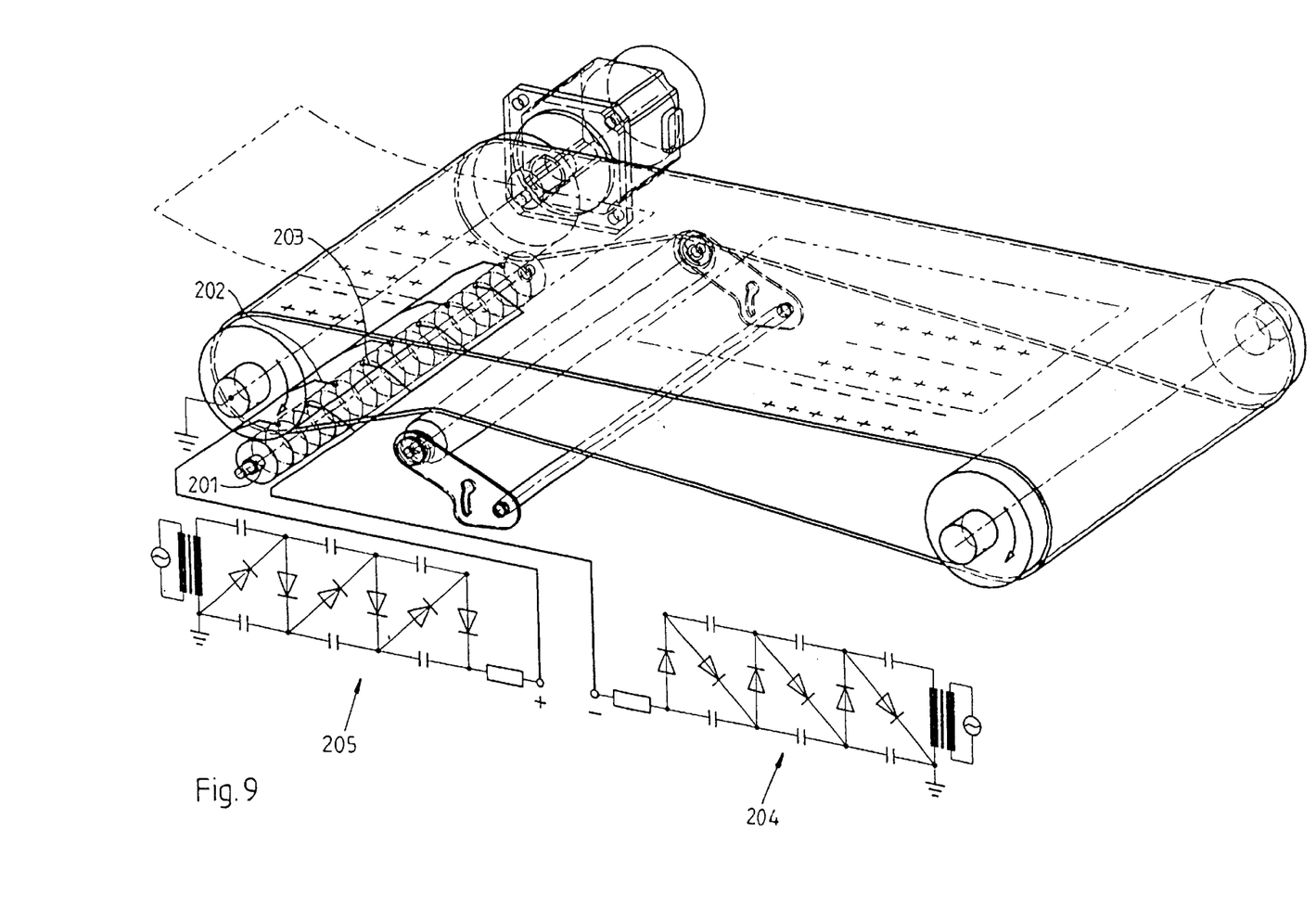
FIG. 9 is a view like that of FIG. 8 of a second embodiment of the sheet-conveying device having one charge roller with two groups of ring-like contacts.

An additional embodiment of the conveying device according to the invention shown in FIG. 9 provides only a single charge roller 201. This charge roller 201 includes two groups of contact rings 202 and 203 which are arranged coaxially and alternatingly with respect to one another. Each group of contact rings 202 and 203 is connected with a separate d.c.-voltage source 204, 205 of opposite polarity.

Figure 10:
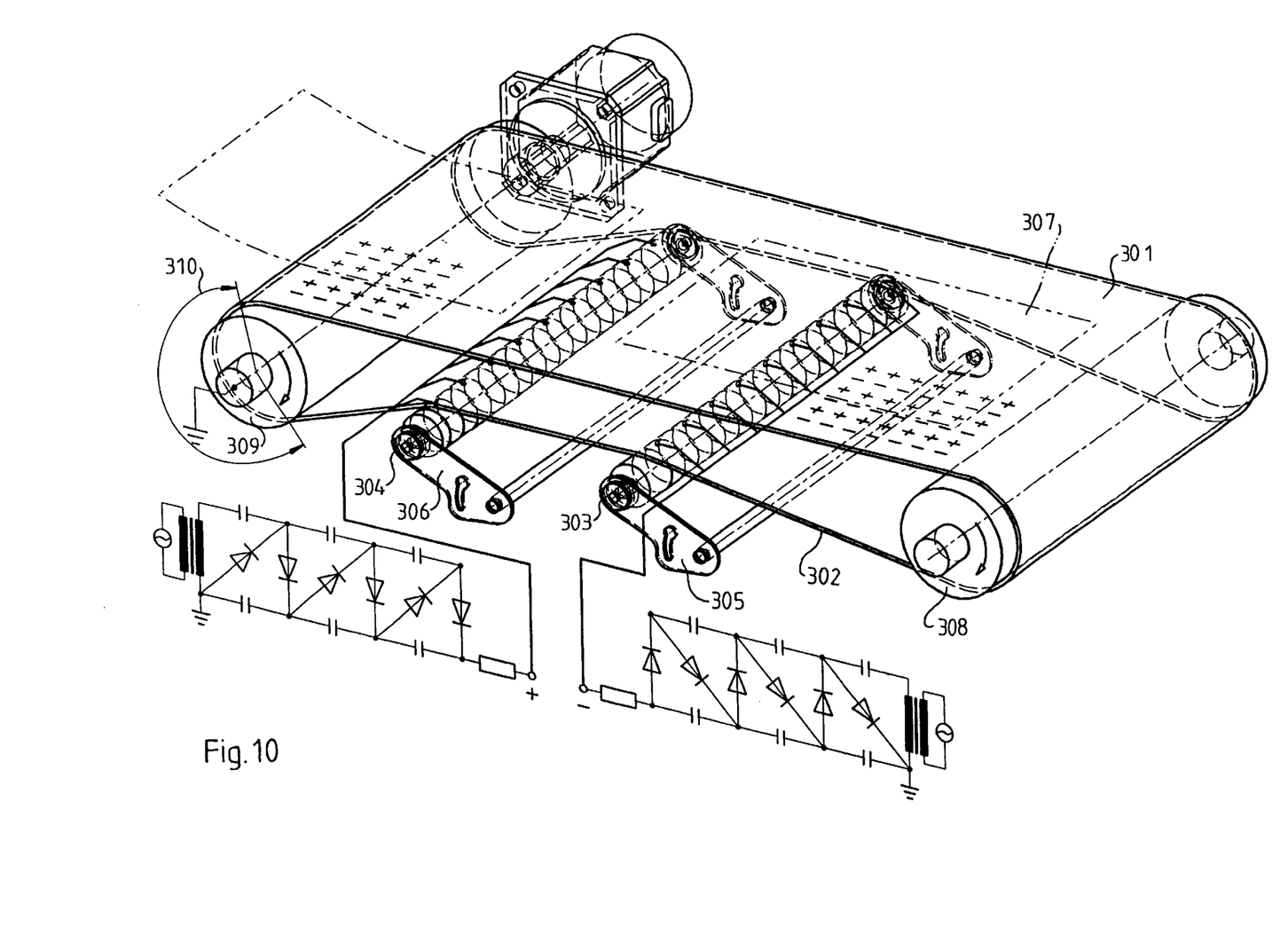
FIG. 10 is a view like those of FIGS. 8 and 9 of a third embodiment of the sheet-conveying device having two charge rollers and a two-layer conveyor belt.

An embodiment of the conveying device according to FIG. 10 provides a two-layer conveyor belt 301. For generating a charge pattern on the surface of the conveyor belt 301, two charge rollers 303 and 304 are arranged in the lower portion 302 of the conveyor belt 301, the charge rollers 303 and 304 being mounted in a respective swivelable holder 305 and 306. The charge rollers 303 and 304 exert pressure on the conveyor belt 301, thereby subjecting the latter to tension. The surface of the conveyor belt 301 facing the sheets 307 is formed of insulating material, while the inner surface of the conveyor belt 301 moving over the guide rollers 308 and 309 is electrically conductive. As opposed to the one-layer construction of the conveyor belt 301 according to FIGS. 8 and 9, the embodiment according to FIG. 10 makes it possible for the sheets 307 to be deposited with a sufficient holding power also outside of the looping region 310 of the conveyor belt 301, due to the mirror-image charges being created.

Figure 11:
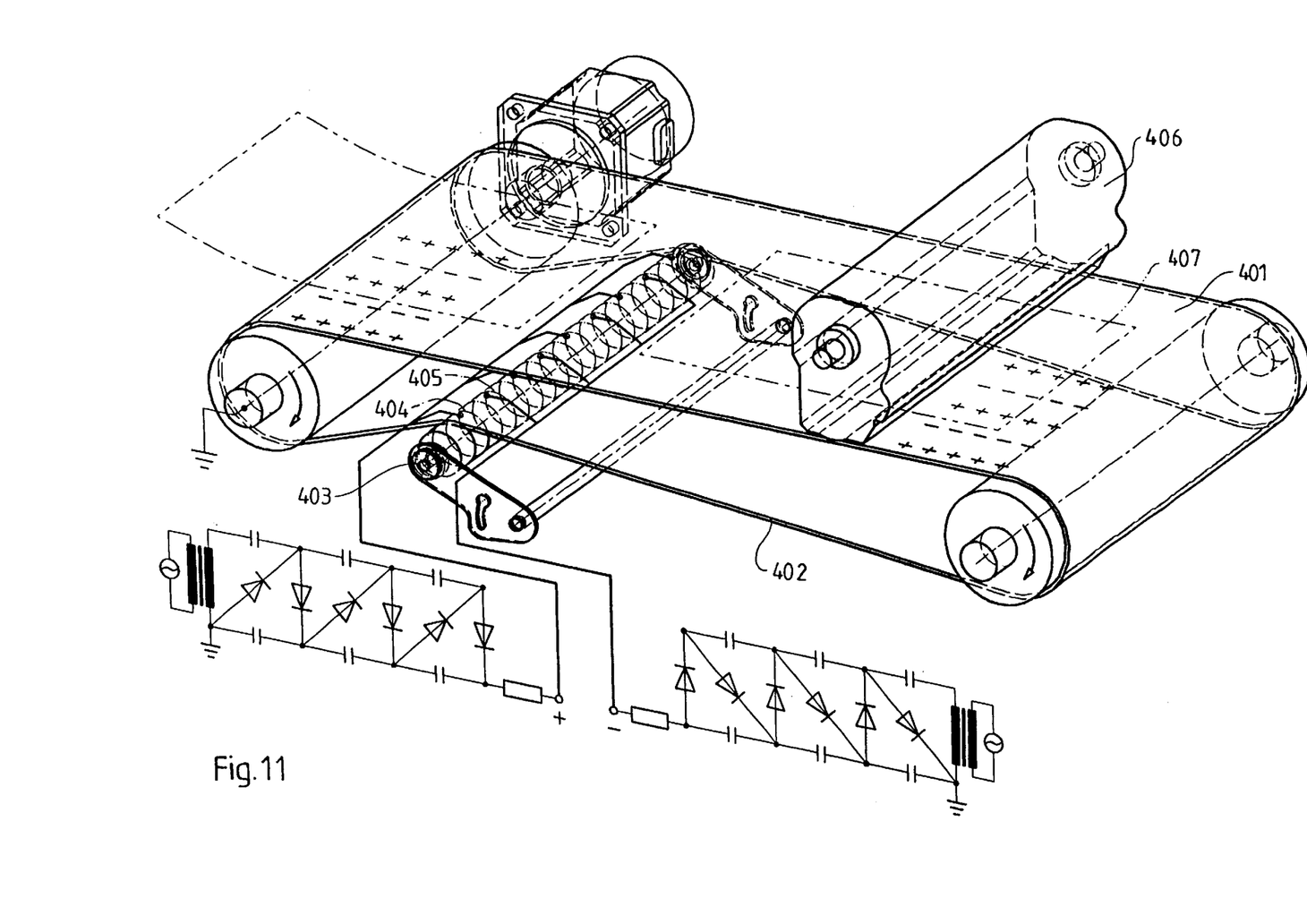
FIG. 11 is a view like those of FIGS. 8, 9 and 10 of a fourth embodiment of the sheet-conveying device having one charge roller and a two-layer conveyor belt.

FIG. 11 shows another embodiment similar to the embodiment of FIG. 9, however, with a two-layer construction of the conveyor belt 401. The charge roller 403 arranged at the lower side or strand 402 of the conveyor belt 401 includes two groups of contact rings 404 and 405, just like the charge roller 201 in FIG. 9. The charge roller 403 functions simultaneously as a press-on roller for tensioning the conveyor belt 401. As a sheet 407 on the conveyor belt passes a printing unit 406, it can be printed on by the printing unit 406.

Figure 12:
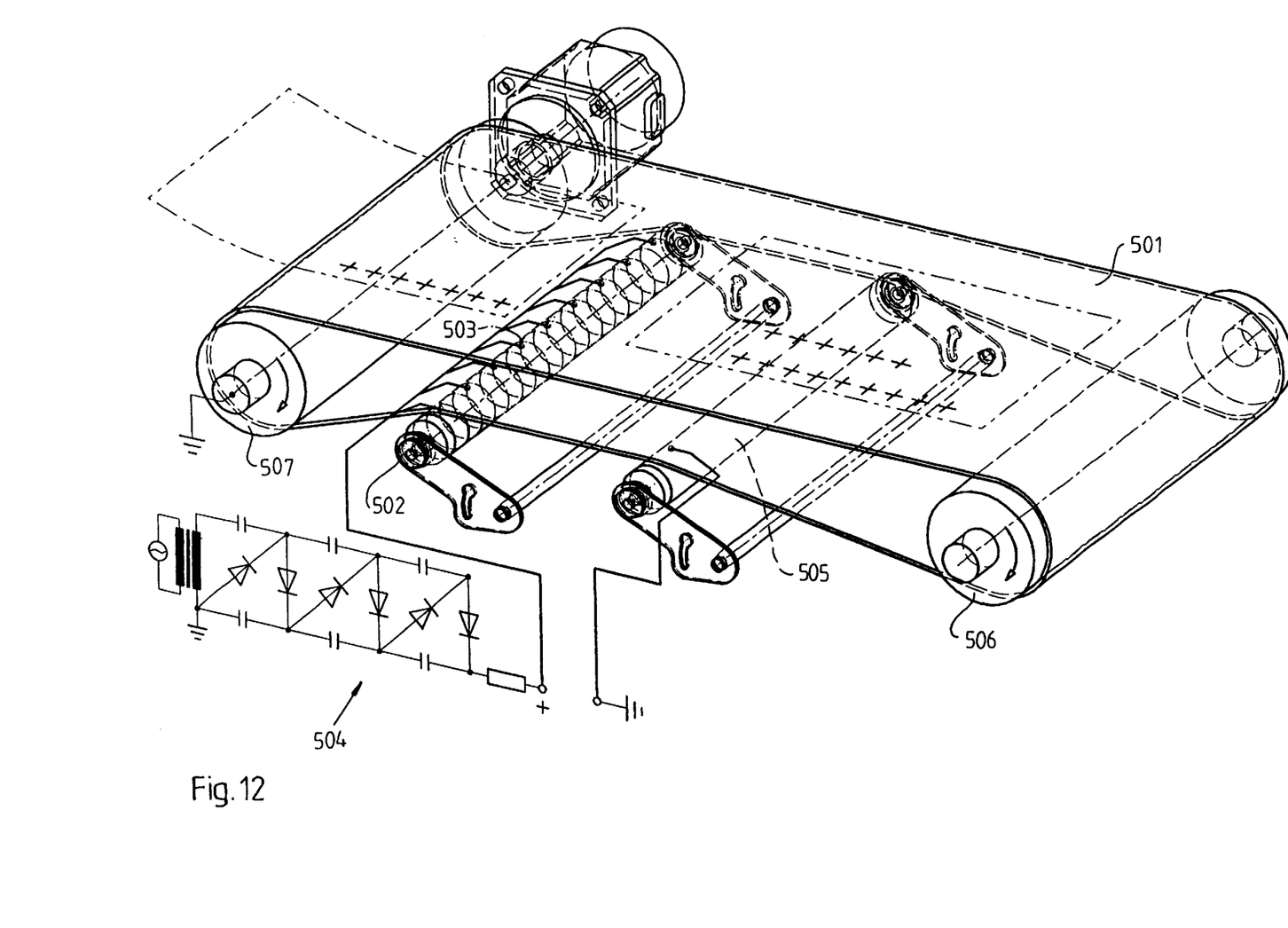
FIG. 12 is a view like those of FIGS. 8 to 11 of a fifth embodiment of the sheet-conveying device having one charge roller and one grounding roller at a two-layer conveyor belt.

FIG. 12 shows a further embodiment of the conveyor device which has a characteristic feature that only one charge roller 502 with only one group of contact rings 503 is assigned to a conveyor belt 501 of a two-layer construction. The contact rings 503 are connected to a d.c. voltage source 504. A grounding roller 505 is arranged in front of the charge roller 502. When the conveyor belt 501 moves around the guide rollers 506 and 507, the charge density pattern remaining on the surface of the conveyor belt 501 is eliminated. The surface of the conveyor belt 501, in the lower side or strand thereof between the grounding roller 505 and the charge roller 502 is neutralized to ground potential. Through the contact rings 503 connected to the positive-pole of the d.c. voltage source 504, positive charge traces with a spacing corresponding to the spacing of the contact rings 503 are created on the surface of the conveyor belt 501, as illustrated in FIG. 12.

In a non-illustrated alternative embodiment, the grounding roller 505 can be connected to a negative d.c. voltage source. In such a case, the negative charges would be changed into positive charges through the contact rings 503, the charge traces between the contact rings 503 then remaining at negative potential. The charge-density pattern created thereby corresponds to that shown in FIG. 11, for example.

Figure 13:
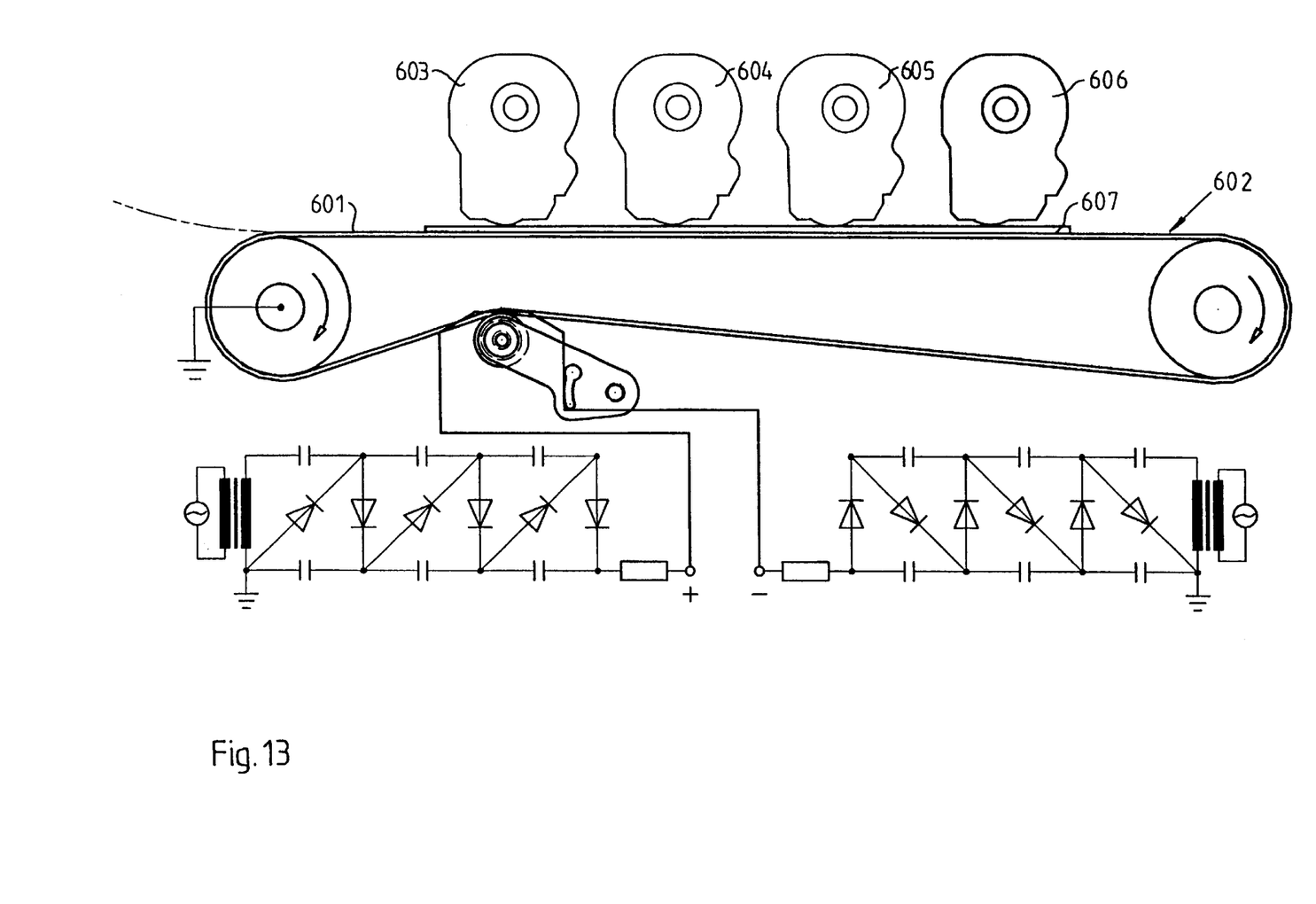
FIG. 13 is a schematic and diagrammatic side elevational view view of the conveyor belt of the sheet-conveying device according to the invention with several printing units arranged along the conveyor belt.
Figure 141:
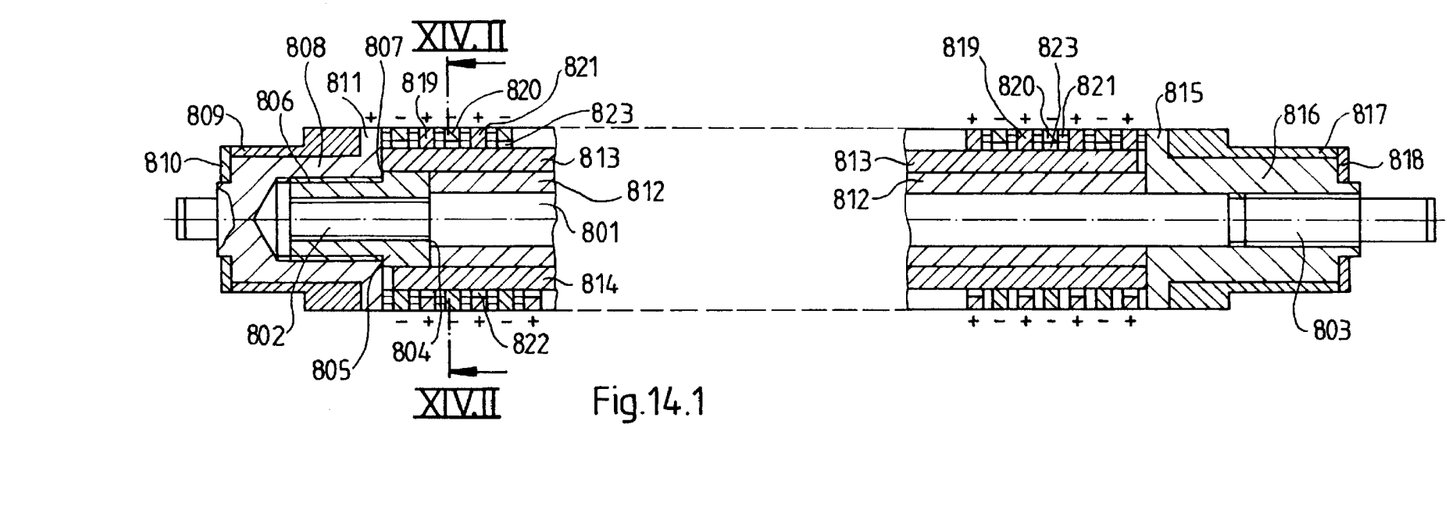
Figure 142:
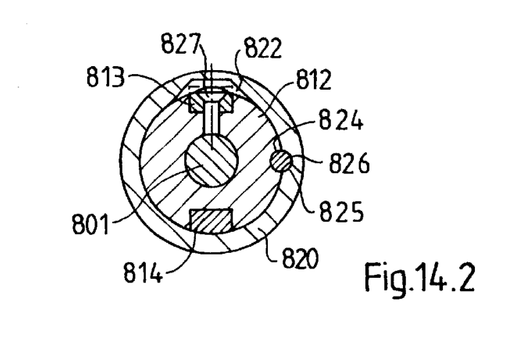

From FIG. 13, it is apparent that the conveying device according to the invention, can be part of a printing unit. Four printing units 603 to 606 are assigned to the upper side or strand 601 of the conveyor belt 602 shown in FIG. 13, so that a passing sheet 607 can be printed in four colors. The charges created on the conveyor belt 602 can be so dimensioned that, for transferring the printing ink or the toner particles from the printing units 603 to 606 to the sheet 607, electrostatic forces can be brought to act upon the printing ink or on the toner particles.

FIGS. 14.1 and 14.2 show an alternative construction of a charge roller as has been used in the embodiments of FIGS. 4, 9 or 11. The charge roller has a shaft 801 with threaded ends 802 and 803. An electrically insulating part 805 is screwed to an abutment surface 804 of the shaft 801. Onto a male screw thread 806 and to an abutment surface 807 of the part 805, there is screwed a tubular part 808 which is electrically conductive. The part 808 is surrounded by insulating parts 809 and 810. The part 808 has a flanged end. The outer surface of the flange 811 forms a first contact surface which is positively charged when the part 808 is connected to a positive d.c. voltage source. On the shaft 801, there is disposed a cylindrical electrically insulating part 812 having the same diameter as the largest outer diameter of the part 805. Distribution strips 813 and 814 are embedded in the part 812 along the outer surface thereof. The distribution strip 813 for the positive potential contacts the flange 811 endwise. The distribution strip 814 contacts a flange 815 of a tubular part 816 which is screwed onto the threaded end 803. The outer surface of the flange 815 forms a contact surface which is negatively charged, whereas the part 816 is connected to a negative d.c. voltage source. The part 816 is surrounded by insulating parts 817 and 818. On the outer surface of the part 812, there are arranged groups of contact rings 819 and 820, with insulating discs 821 disposed therebetween. The first group of contact rings 819 is in contact with the distribution strip 813 and thereby connected to a positive potential. The second group of contact rings 820 is in contact with the distribution strip 814 connected to a negative potential. The contact rings 819 and 820 are formed with recesses 822 and 823 in order to bypass or bridge the distribution strips 813 and 814 with opposite polarity. On the outside of the part 812 and on the inside of the contact rings 819 and 820 there are provided semi-cylindrical recesses 824 and 825 into which an insulating cylindrical part 826 is inserted in order to secure the contact rings 819 and 820 against relative rotation. The distribution strips 813 and 814 are fastened in the part 812 by screws 827. The connections of the parts 806 and 816 to the d.c. voltage sources are not illustrated. These connections may be made through conventional sliding contacts.

Figure 151:
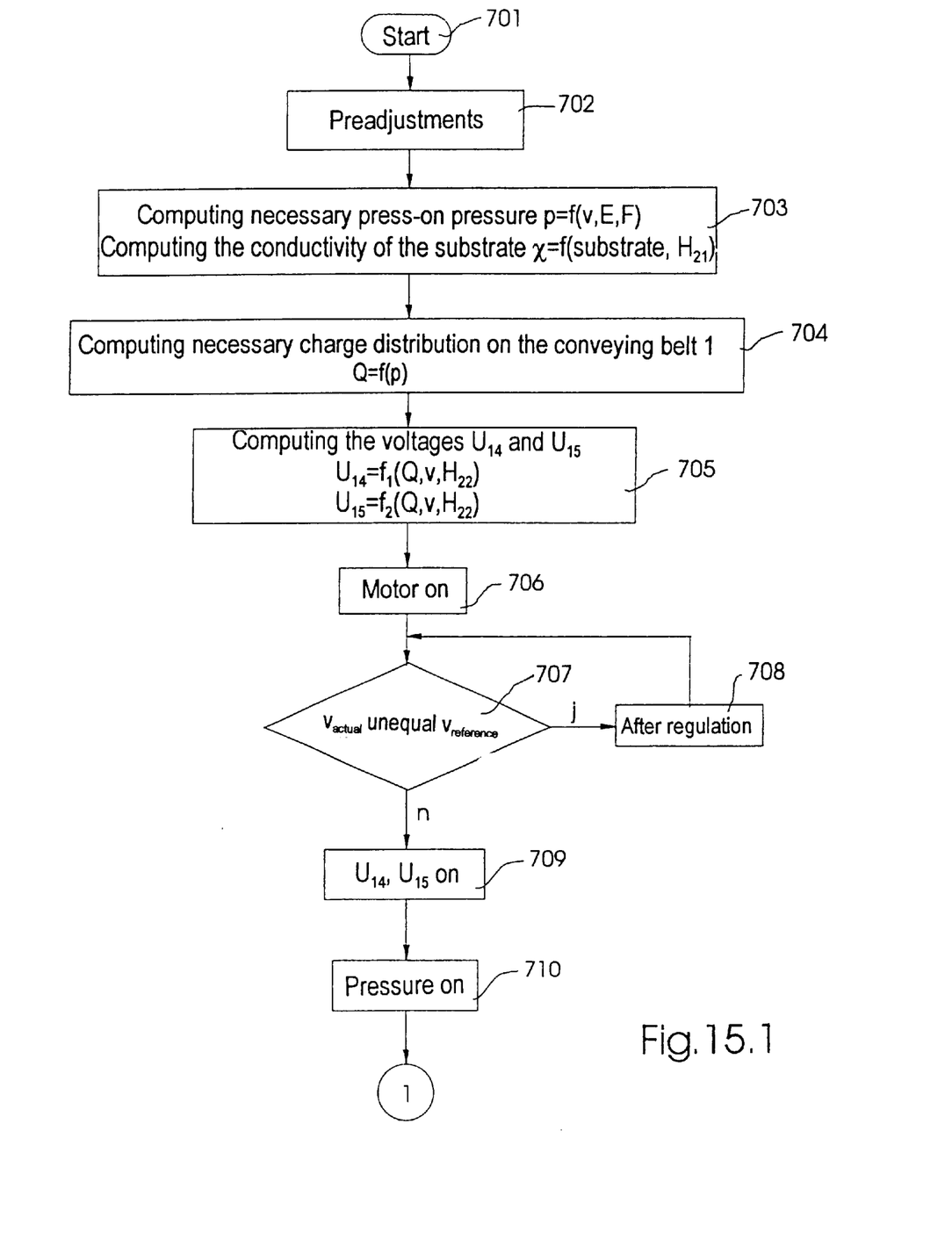
Figure 152:
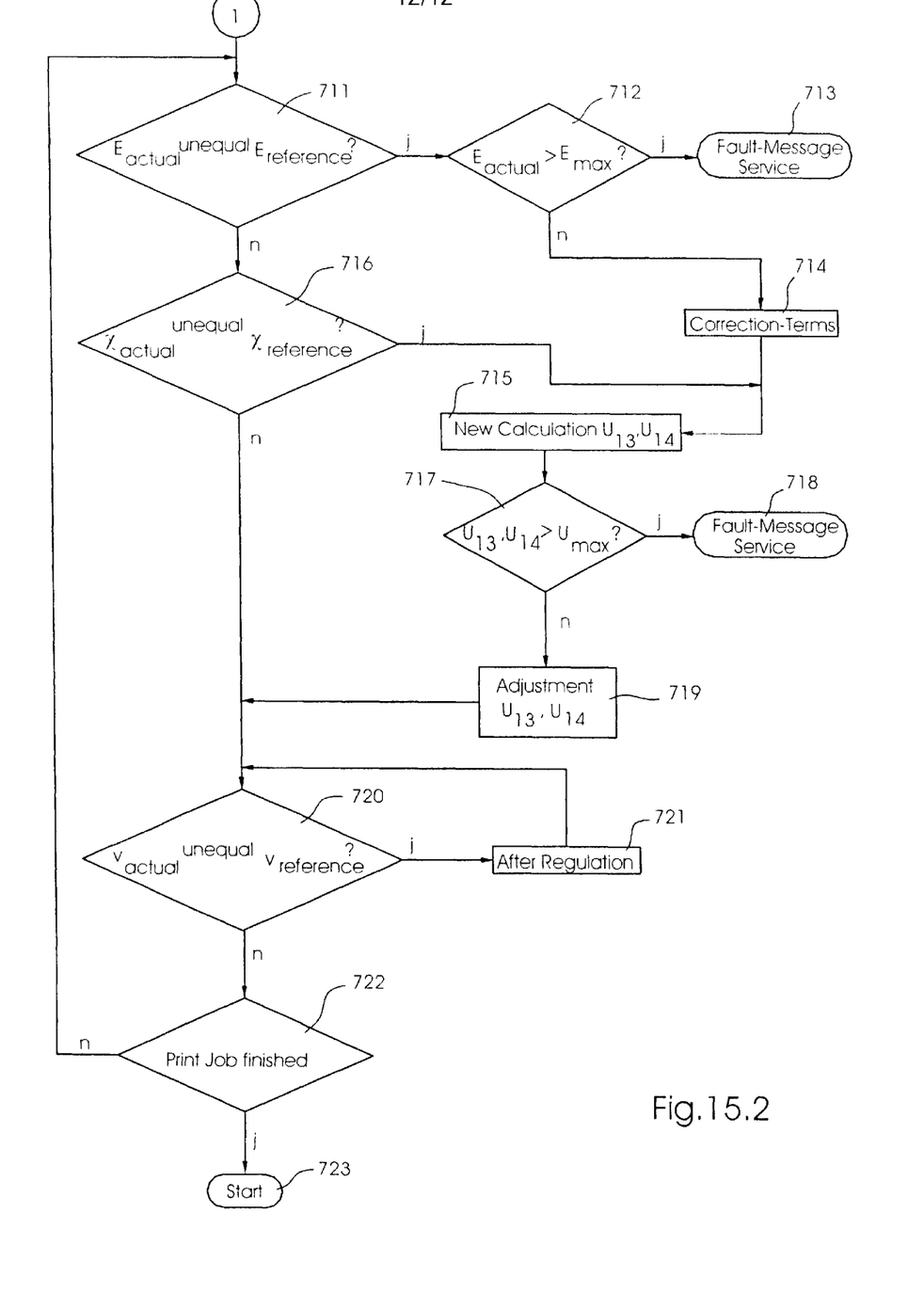

In accordance with FIGS. 15.1 and 15.2 and the diagrammatic and schematic view of FIG. 1, the function of the control device 20 in connection with the transport of sheets 7 through a printing press is described as follows:

The flow chart according to FIGS. 15.1 and 15.2 includes, in addition to a starting step 701, a step 702 to perform preadjustments or presettings. In step 702, all order-related data, such as type of paper, paper thickness, paper moisture, paper format and number of prints are input. In a step 703, the necessary or required press-on pressure p of the substrate or sheet 7 on the conveyor belt 1 and the conductivity $\chi$ of the material of the sheet 7 are calculated from these specific order data. In calculating the necessary or required press-on pressure p, the printing speed v, the field intensity E in the material of the sheet 7 and the force F created on the sheet 7 by the action of a printing unit, amongst others, are taken into consideration. The conductivity $\chi$ of the sheet 7 results from the material properties of the sheet 7 and the moisture $H_{21}$, detected by the sheet-moisture sensor 21. In a step 704, the necessary or required charge distribution Q on the conveyor belt 1 is calculated by using the press-on pressure p calculated in step 703, the distance or spacing of the electrodes 9 and 10 between one another being taken into consideration. In a further step 705, the amount of the voltages $U_{13}$ and $U_{14}$ are calculated, the amount thereof depending upon the charge distribution Q calculated in step 704, upon the speed v of the conveyor belt 1 and upon the environmental humidity $H_{22}$. The humidity $H_{22}$ is detected by the humidity sensor 22. After the aforedescribed preadjustments or presettings and the calculations made in the steps 702 to 705, the motor 4 can be switched on in a step 706. When, in a step 707, it is determined that the actual speed $v_{actual}$ of the conveyor belt 1 is not in correspondence with the reference speed v, then the number of--rotations of the motor 4 is regulated in a step 708. When the reference speed $v_{reference}$ is reached, the voltages $U_{13}$ and $U_{14}$ are applied to the electrodes 9 and 10 in a step 709. As soon as a sheet 7 held on the conveyor belt 1 arrives at the printing unit, the printing unit is set into operation in a step 710. During printing on the sheets 7, continuous checking is performed in a step 711 as to whether the field intensity $E_{actual}$ present in the material of the sheets 7 corresponds with the reference field intensity $E_{reference}$. When the present field intensity $E_{actual}$ is greater than the reference field intensity $E_{reference}$, which is checked in a step 712, then a fault-message is emitted in a step 713. Otherwise, correction terms are created in a step 714, by which, in a step 715, the amounts of the voltages $U_{13}$ and $U_{14}$ are calculated anew. In a step 716, a check is made as to whether a change in conductivity $\chi$ as a result of changes in the surface moisture $H_{21}$ of the sheets 7 or as a result of changes in the humidity $H_{22}$ in the air has occurred. If this is the case, the amounts of the voltages $U_{13}$ and $U_{14}$, in the step 715, are corrected according to the change in conductivity. In a step 717, a check is made as to whether the voltages $U_{13}$ and $U_{14}$ exceed a maximal value $U_{MAX}$. If this is the case, a fault-message is emitted in a step 718. When the voltages $U_{13}$ and $U_{14}$ lie within the permitted range, then, in a step 719, the high-voltage sources 13 and 14 are set to the new values $U_{13}$ and $U_{14}$ via the control inputs 18 and 19. In a step 720, the actual speed $v_{actual\ b}$ of the conveyor belt 1 is continuously compared with a reference speed $v_{reference}$. If there is a deviation from the reference speed $v_{reference}$, regulation of the speed takes place in a step 721. Finally, continuous checking is performed in a step 722 as to whether a prescribed number of sheets 7 have already been printed. If not, then the steps 711 to 722 are repeated, until the preset number of sheets is reached. The printing process is completed with the step 723.

We claim:

1. A device for conveying thin workpieces used in the printing technology field; comprising:

at least one moveable conveying element having an electrically insulating contact surface for supporting at least one of the workpieces as it is being conveyed, said conveying element formed without electrode material;

a d.c. voltage source supplying at least a first voltage potential; and a plurality of contacts disposed to engage said contact surface of said conveying element, said plurality of contacts including a group of contacts electrically connected to said first voltage potential;

said plurality of contacts for applying regions of charge density to said conveying element to hold the workpiece on said contact surface of said conveying element.

2. The device according to claim 1, wherein said d.c. source supplies a second voltage potential;

said group of contacts defines a first group of contacts; and said plurality of contacts includes a second group of contacts electrically connected to said second voltage potential.

3. The device according to claim 1, wherein said plurality of contacts are formed of coaxially arranged rings of like diameter disposed to roll against said contact surface of said conveying element.

4. The device according to claim 1, wherein the contacts of all of the groups of contacts are arranged coaxially with respect to one another.

5. The device according to claim 1, wherein said contacts are arranged on a cylinder formed of insulating material.

6. The device according to claim 1, wherein said contacts are spaced a distance apart from one another, in a direction transverse to a conveying direction, the spaced distance being adjustable in accordance with the dimensions of the thin workpiece to be conveyed.

7. The device according to claim 1, further comprising an electrostatic charge device disposed upstream of said group of contacts, as viewed in the conveying direction, for generating on said contact surface of said conveying element a homogeneous charge having a potential opposite to that applied by said group of contacts.

* * * * *